(12) United States Patent
Bertolini et al.

(10) Patent No.: US 6,510,657 B1
(45) Date of Patent: Jan. 28, 2003

(54) VEHICLE DOOR MODULE HAVING TWO SEALED PANELS

(75) Inventors: Carlo Bertolini, Feucherolles (FR); Laurent Arquevaux, Sully sur Loire (FR)

(73) Assignee: Meritor Light Vehicle Systems-France, Paris (FR)

( * ) Notice: Subject to any disclaimer, the term of this patent is extended or adjusted under 35 U.S.C. 154(b) by 0 days.

(21) Appl. No.: 09/056,917

(22) Filed: Apr. 8, 1998

(30) Foreign Application Priority Data

Apr. 15, 1997 (FR) .............................. 97 04625

(51) Int. Cl.[7] .................................................. B60J 5/04
(52) U.S. Cl. .......................... 49/502; 49/352; 296/146.5
(58) Field of Search .......................... 49/352, 374, 502; 296/148, 149, 146.2, 146.3, 146.5

(56) References Cited

U.S. PATENT DOCUMENTS

| | | | |
|---|---|---|---|
| 4,607,456 A | * 8/1986 | Sharaishi et al. | .............. 49/352 |
| 4,648,206 A | * 3/1987 | Moriya et al. | ................. 49/352 |
| 4,937,977 A | * 7/1990 | Gergoe et al. | ................. 49/352 |
| 5,095,659 A | * 3/1992 | Benoit et al. | ................... 49/503 |
| 5,379,553 A | 1/1995 | Kimura et al. | ................. 49/502 |
| 5,404,690 A | * 4/1995 | Hanf | ........................ 296/146.6 |
| 5,555,677 A | * 9/1996 | DeRees et al. | ................ 49/502 |
| 5,581,952 A | * 12/1996 | Kapes et al. | ..................... 49/502 |
| 5,785,376 A | * 7/1998 | Nees et al. | ............... 286/146.6 |
| 5,809,695 A | * 9/1998 | Strickland | ..................... 49/352 |

FOREIGN PATENT DOCUMENTS

| | | |
|---|---|---|
| EP | 405159 A1 | 5/1990 |
| EP | 69427 A2 | 7/1995 |
| EP | 712746 A1 | 10/1995 |

* cited by examiner

*Primary Examiner*—Daniel P. Stodola
(74) *Attorney, Agent, or Firm*—Carlson, Gaskey & Olds

(57) ABSTRACT

A vehicle door module adapted to support mechanisms such as a window raiser (12) and to be applied in a sealed manner on the surround of two inner openings (7,9) of a box structure of the door includes two distinct panels (3,4) interconnected by a rigid structure (5,6). Each panel is adapted to support components (13,19) of the mechanisms and to be applied in a sealed manner on a respective one of the openings (7,8) of the box structure (9), which has a contour complementary to the contour of the each panel. The window raiser (12) may be of the "double lift" type having two guide rails (13,14) each mounted on a respective panel (3,4). This division into two parts (3,4) reduces the amount of plastics material required and reduces the manufacturing cost of the module (1) while a rigid structure (11) between the two openings (7,8) of the door increases the rigidity of the latter.

10 Claims, 1 Drawing Sheet

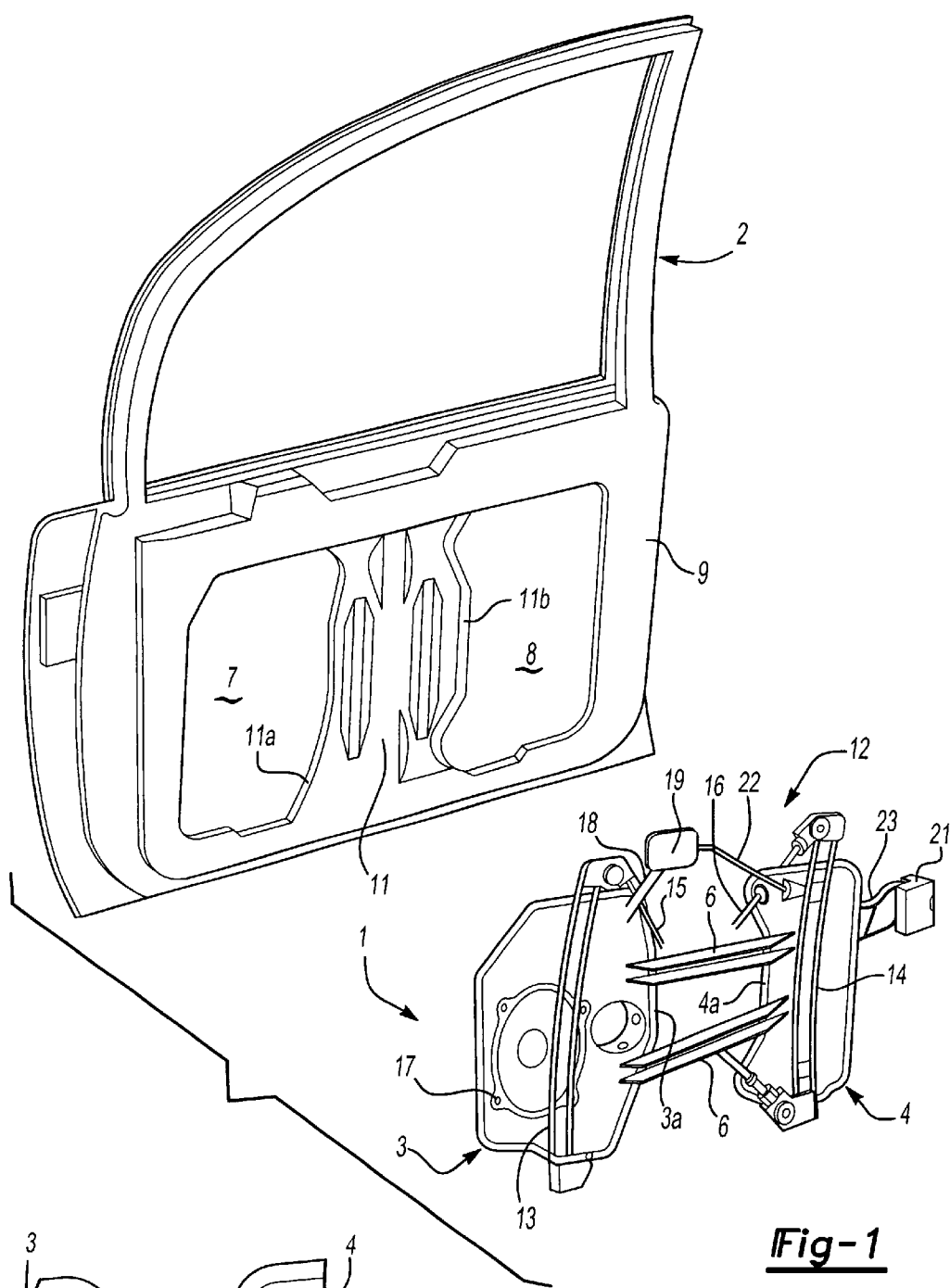
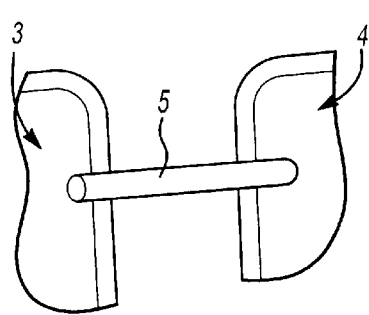

VEHICLE DOOR MODULE HAVING TWO SEALED PANELS

The present invention relates to an automobile vehicle door module and to the assembly formed by the door and the associated module.

It is known that sealed door modules are adapted to support components such as a window raiser, a lock and an inner actuating handle of the lock, and to be applied in a sealed manner against the periphery of an inner opening of a box structure of the door, this opening permitting the mounting of mechanisms in the door.

More particularly, the invention is applicable to door modules provided with a window raiser of the "double lift" type having two roughly parallel guide rails and a mechanism including cables arranged in the shape of an X wound on a drum. The module supporting these components preferably is made of a suitable plastic material.

An object of the invention is to reduce the cost of manufacturing the module supporting the components of the mechanisms.

According to the invention, the door module comprises two distinct panels interconnected by connecting members, each panel being adapted to support components of mechanisms, and to be applied in a sealed manner on an opening of the box structure having a contour complementary to that of the associated panel.

In this way, the volume of plastics material required for producing the module is distinctly less than that of a module in a single part as has been conventionally provided up to the present time. The amount of material required and therefore the manufacturing cost of the module are in this way reduced.

The assembly comprising the vehicle door and the module to which the invention also relates is particularly adapted to the case where the window raiser is of the "double lift" type mentioned above. This assembly is characterized in that the box structure of the door defines two openings, the contour of which is adapted to receive in a sealed manner a corresponding panel of the module, namely a front opening and a rear opening separated by a rigid structure.

The door is consequently less cut away than in the conventional case of a module in a single part and thus has greater rigidity provided by the central structure separating the two openings.

Further features and advantages of the invention will be apparent from the following description with reference to the accompanying drawing, which illustrates two embodiments of the invention by way non-limitative examples.

BRIEF DESCRIPTION OF THE DRAWINGS

FIG. 1 is an exploded perspective view of an embodiment of the sealed door module of the invention and of the corresponding vehicle door viewed from the inside.

FIG. 2 shows an alternative configuration of a connecting member useful with the embodiment of FIG. 1.

DETAILED DESCRIPTION OF THE PREFERRED EMBODIMENT

The Figure illustrates a module 1 adapted to be applied internally on a vehicle door 2. The module 1 comprises two distinct panels 3, 4, namely a front panel 3 and a rear panel 4, mechanically interconnected by connecting members. These connecting members are advantageously formed by a rigid structure that may, for example, comprise at least one, and preferably two, hollow bodies 5 obtained in the known manner by gas injection.

As another example, the connecting structure is formed by at least one, and preferably two, cross-braced beams 6 as shown, fixed by their ends to the respective panels 3 and 4.

Each panel 3, 4 is adapted to be applied in a sealed manner on a respective opening 7, 8 arranged in the inner panel of the box structure 9 of the door 2. The openings 7, 8 are separated by a rigid structure 11 extending generally vertically and having opposite edge portions 11a, 11b suitably shaped for adapting themselves to the shapes of the respective edge portions 3a, 4a of the panels 3, 4.

The window raiser 12 with which the module 1 is provided is of the "double lift" type, which is formed by two roughly vertical and parallel rails 13, 14 guiding cables 15, 16 arranged in the shape of an X between the rails 13, 14 and wound round a drum 17. The mechanism of this "double lift" window raiser 12 is known in the art and therefore requires no detailed description.

The guide rail 13 is mounted on the front panel 3 and the rear rail 14 is mounted on the rear panel 4. The rails are fixed to the panels by any known means (not shown). The panel 3 comprises in its upper part a lug 18 that, at one end, supports an inner handle 19 for actuating a lock or latch 21 through a connecting rod 22. The lock 21 is preferably fixed to the end of a ribbed arm 23 fixed to the rear panel 4.

Thus the front opening 7 is used for inserting the front rail 13 and the handle 19, while the rear opening 8 permits the insertion of the rear panel 4, the rear rail 14 and the lock 21. The panels 3, 4 and the components of the mechanisms supported on the panels 3 and 4 are inserted and fixed inside the door by any known means (not shown). The outer peripheries of the panels 3, 4 preferably are applied in a sealed manner on the corresponding peripheral portions of the openings 7, 8.

Since the module 1 is divided into two panels 3, 4 and the inner wall of the box structure 9 is divided into two openings 7, 8 separated by a rigid central structure 11, the door 2 has less material cut away than with a single opening for receiving the module, and is consequently more rigid.

The scope of the invention is not intended to be limited to the described embodiments and the invention may include variants. For example, the window raiser with which the module 1 is provided is not necessarily of the "double lift" type and the two panels making up the module may be arranged one above the other and form an upper panel and a lower panel for mechanisms adapted to this arrangement, two openings arranged one above the other being in this case provided in the box structure 9 of the door 2.

The scope of legal protection is defined by the following claims.

What is claimed is:

1. A module of a vehicle door for application in a sealed manner on the periphery of two openings provided in an inner side wall of a box structure of said door, said module being provided for supported components of mechanisms and comprising:
   two distinct panels made from separate pieces of material:
      a connecting member interconnecting said panels, each panel being provided for application in a sealed manner on the periphery of a respective one of said two openings, which has a contour complimentary to the contour of said each panel.

2. The module according to claim 1, further comprising a window raiser including two guide rails, cables arranged in the shape of an X and a drum supporting said cables, each panel supporting a respective one of said rails, and wherein said connecting member is a rigid structure.

3. The module according to claim 2, wherein said rigid structure comprises at least one hollow body.

4. The module according to claim 2, wherein said rigid structure comprises at least one cross-braced beam.

5. A vehicle door assembly, comprising:
- a door frame;
- a box structure having an inner side wall defining two openings;
- a module including two distinct panels made from separate pieces and connecting means interconnecting said two panels, each panel being applied in a sealed manner on said side wall around a respective one of said two openings, which has a contour complementary to the contour of said each panel.

6. The assembly according to claim 5, wherein said two openings are a front opening and a rear opening and said connecting means are in the form of a rigid structure.

7. A vehicle door assembly, comprising:
- a door frame;
- a structure supported on said frame including a first opening having a periphery and a second opening having a periphery with a generally rigid member positioned between said openings;
- a first panel sealingly engaging said first opening periphery;
- a second panel sealingly engaging said second opening periphery; and
- a rigid connecting member fixed to and extending between said panels.

8. The assembly of claim 7, wherein said rigid member forms a portion of said first opening periphery and a portion of said second opening periphery respectively.

9. The assembly of claim 7, wherein said opening peripheries each have a contour and wherein said panels have corresponding contours, respectively.

10. The assembly of claim 7, further comprising a window lift device including guide rails and wherein one of said guide rails is supported on said first panel and the other said guide rail is supported on said second panel.

* * * * *